US008527285B2

(12) United States Patent
Ryan, Jr. et al.

(10) Patent No.: US 8,527,285 B2
(45) Date of Patent: Sep. 3, 2013

(54) POSTAGE PRINTING SYSTEM FOR PRINTING BOTH POSTAL AND NON-POSTAL DOCUMENTS

(75) Inventors: Frederick W. Ryan, Jr., Oxford, CT (US); Robert A. Cordery, Danbury, CT (US); Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 2168 days.

(21) Appl. No.: 11/476,284

(22) Filed: Jun. 28, 2006

(65) Prior Publication Data

US 2008/0005042 A1 Jan. 3, 2008

(51) Int. Cl.

| | |
|---|---|
| ***G06Q 10/00*** | (2012.01) |
| *G06F 17/00* | (2006.01) |
| *G06F 21/00* | (2006.01) |
| *G06G 7/00* | (2006.01) |

(52) U.S. Cl.
USPC ................................ 705/1.1; 705/400; 705/50

(58) Field of Classification Search
USPC ....... 705/1.1, 7.11–7.35, 50, 60–68, 400–411
See application file for complete search history.

(56) References Cited

U.S. PATENT DOCUMENTS

| | | | | |
|---|---|---|---|---|
| 4,253,015 A | | 2/1981 | McFiggans et al. | 235/92 FP |
| 4,253,158 A | | 2/1981 | McFiggans | 364/900 |
| 5,386,303 A | * | 1/1995 | Kihara | 358/453 |
| 5,483,602 A | | 1/1996 | Stenzel et al. | |
| 5,533,144 A | | 7/1996 | Fan | 382/135 |
| 5,611,630 A | | 3/1997 | Dolan et al. | |
| 5,798,844 A | | 8/1998 | Sakano et al. | |
| 6,026,186 A | | 2/2000 | Fan | 382/201 |
| 6,067,374 A | | 5/2000 | Fan et al. | 382/135 |
| 6,181,813 B1 | | 1/2001 | Fan et al. | 382/135 |
| 6,202,092 B1 | | 3/2001 | Takimoto | |
| 6,317,524 B1 | | 11/2001 | Wu et al. | 382/298 |
| 6,515,755 B1 | | 2/2003 | Hasegawa | |

(Continued)

FOREIGN PATENT DOCUMENTS

| | | |
|---|---|---|
| EP | 1143385 A1 | 10/2001 |
| WO | 0243056 A2 | 5/2002 |

OTHER PUBLICATIONS

Performance Criteria For Information-Based Incidicia and Security Architecture for Closed IBI Postage Metering Systems (PCIBI-C); US Postal Service, Jan. 12, 1999.

*Primary Examiner* — George Chen
(74) *Attorney, Agent, or Firm* — Brian A. Lemm; Charles R. Malandra, Jr.; Steven J. Shapiro

(57) ABSTRACT

A method for printing secure source images of the type that contain specific critical elements and non-secure images on a single printer includes determining the origin of an image (secure source or non-secure source). If the image to be printed is from the non-secure source, a determination is made if the image contains the specific critical elements of the type contained in secure source images. Printing of the image from the non-secure source is disabled if the image contains specific critical elements of the type contained in secure source images. Printing of the image from a non-secure source is enabled if the image does not contain specific critical elements of the type contained in the secure image. The determination if the non-secure source image contains the specific critical elements of the type contained in secure source images can be made after printing has commenced of the non-secure image.

14 Claims, 5 Drawing Sheets

(56) References Cited

U.S. PATENT DOCUMENTS

| | | | | |
|---|---|---|---|---|
| 6,533,385 | B1 | 3/2003 | Mackey et al. | 347/19 |
| 6,542,629 | B1 | 4/2003 | Wu et al. | 382/135 |
| 6,580,820 | B1 | 6/2003 | Fan | 382/135 |
| 6,612,684 | B2 | 9/2003 | Mackay et al. | 347/40 |
| 7,054,461 | B2 | 5/2006 | Zeller et al. | |
| 7,114,657 | B2 | 10/2006 | Auslander et al. | |
| 7,191,336 | B2 | 3/2007 | Zeller et al. | |
| 7,385,728 | B2 | 6/2008 | Lay et al. | |
| 7,483,175 | B2 | 1/2009 | Ryan, Jr. et al. | |
| 2002/0046196 | A1 * | 4/2002 | Ogg | 705/406 |
| 2002/0054315 | A1 | 5/2002 | Masaki et al. | |
| 2002/0176114 | A1 | 11/2002 | Zeller et al. | |
| 2004/0141190 | A1 | 7/2004 | Akashi | |
| 2004/0165211 | A1 | 8/2004 | Herrmann et al. | |
| 2005/0086516 | A1 | 4/2005 | Ueda et al. | |
| 2005/0120244 | A1 | 6/2005 | Choi | |
| 2005/0144469 | A1 | 6/2005 | Saitoh | |
| 2006/0012805 | A1 | 1/2006 | Liu | |
| 2007/0146768 | A1 | 6/2007 | Isoda | |
| 2007/0146806 | A1 | 6/2007 | Ishihara | |
| 2007/0242312 | A1 | 10/2007 | Tsutsumi | |

* cited by examiner

POSTAGE PRINTING SYSTEM FOR PRINTING BOTH POSTAL AND NON-POSTAL DOCUMENTS

FIELD OF THE INVENTION

The present invention relates to printing both secure and non-secure documents with a single printer and more particularly to printing both postal and non-postal documents with a postage printing system in a manner that protects the security of the postal document printing.

BACKGROUND OF THE INVENTION

Existing traditional closed postage printing systems are secure printing systems that are restricted to printing postage and postage related items such as meter register reports. These systems must ensure that the secure printer cannot be used to produce fraudulent copies of postal indicia without leaving evidence of tampering. As a result, traditional closed postage printing systems are single purpose devices used to print postage and postage related reports. These systems in certain implementations are enclosed in a single secure tamper resistant housing.

This restriction on printing limits the usefulness of such postage printing systems. As a result, users often employ two printers, one for printing postage indicia and related items and another as a generic printer for printing other non-postal items. For example, a postage printing system that prints on labels may be able to print postage, return addresses and destination addresses. However, the printer could not be used as a generic printer to print other images such as a corporate logo in the return address or product labels since the images could be made to be copies of valid postage indicia.

Closed postage printing systems, where the printer is dedicated to printing postal indicia and other postal related items, may be a single unit or may be implemented as a peripheral device. If the printer is implemented as a peripheral device portions of the host application and printer controller may be implemented in a host computer such as a personal computer (PC). Similarly the host application may further be implemented as a combination of a host computer application and a data center application. The host application formats data to send to the printer controller for printing. The printer controller authenticates the data that is sent by the host application. The authentication can take many forms. The print controller may simply check to see that a communications protocol has been implemented correctly or may perform cryptographic operations to ensure the source and/or integrity and/or freshness of the data. After authenticating the data, the print controller converts the data into control signals that instruct the print engine how to print the document. The print engine includes motors and a mechanism to create an image on the document employing, for example, an ink jet or a thermal print head. The print engine may also communicate status to the printer controller including out of paper, out of ink, over temperature condition, and the like.

SUMMARY OF THE INVENTION

It is an object of the present invention to print both secure images such as postage indicia and non-secure user defined images such as logos on the same printer. It is still another object of the present invention to enable the use of many general purpose printers to print both secure and non-secure images, including those printers that may have limited processing capability.

It has been discovered that by introducing a second mode of printing, a postage printing system can be used for printing both secure and non-secure documents without loss of security. This is accomplished by analyzing data employed in printing a document in a non-secure mode and preventing complete printing of the document if it could contain a critical element of a document printed in the secure mode.

It has also been discovered that by detecting in an image the presence of a specific type of bar code, such as a two-dimensional bar code of a postal indicia, and preventing the printing of any images that contain such bar code except when the image is from a secure source, a user may be enabled to use a single printer to print both secure images and other images which may be non-secure. A secure image is meant to include an image that is authorized, such as a postal indicium for which payment has been authorized and accounted. As a result, a user cannot fraudulently print a copy of or an image that looks like valid postal indicia using the same printer.

In accordance with an aspect of the present invention, software may be embedded in a printer which analyzes an image as it is printing to determine if the image contains a bar code of the type employed in a secure image such as a postal indicia two-dimensional bar code. If the image contains a bar code that could be part of a secure image, printing is halted prior to printing of the complete bar code unless the image comes from a secure source. The invention enables detection of the potential presence of a postal type bar code in a limited processing environment such as is found in many printers and also in an environment where all of the data necessary to produce the bar code image may not be resident at any one time.

A method for printing secure source images of the type that contain specific critical elements and non-secure images on a single printer embodying the present invention includes the steps of determining if an image to be printed is from a secure source or from a non-secure source. If the image to be printed is from the non-secure source, it is determined if the image contains a specific critical element of the type contained in secure source images. Printing of the image from the non-secure source is disabled if the image contains a specific critical element of the type contained in secure source images. Printing of the image from the non-secure source is enabled if the image does not contain a specific critical element of the type contained in the secure image.

A method for printing secure source images of the type that contain a specific critical element and non-secure source images on a single printer also embodying the present invention includes the steps of enabling printing on the printer of all secure source images. Also enabled for printing on the printer are all non-secure source images except those images that contain a specific critical element of the type contained in secure images.

A printer for printing secure source images that contain a specific critical element and non-secure images embodying the present invention includes a printer controller for controlling the printing of said printer. The printer controller includes software for detecting after printing has commenced if an image to be printed contains a specific critical element.

Another method for printing secure source images of the type that contain specific critical elements and non-secure images on a single printer embodying the present invention includes the steps of commencing printing of an image from the non-secure source. During the printing of the image from said non-secure source, it is determined if the image contains a specific critical element of the type contained in secure source images and disabling completion of said printing of the image from the non-secure source if the image contains a specific critical element of the type contained in secure source images.

Yet another method for printing secure source images of the type that contain specific critical elements and non-secure images on a single printer includes the steps of commencing printing of an image from the non-secure source by creating pixels to be imprinted on a media and processing the pixels to determine transitions in contrast between pixels created for imprinting on the media. The pixel transition history is stored. A determination is made if the stored pixel transition history is consistent with the type of pixel transitions of the secure source specific critical elements. Completion of the printing of the image from the non-secure source is disabled if the stored pixel transition history is consistent with the type of pixel transitions of the secure source specific critical elements.

BRIEF DESCRIPTION OF THE DRAWINGS

Reference is now made to the various figures in which similar reference numerals in the various figures designate similar elements and in which.

DETAILED DESCRIPTION OF THE PREFERRED EMBODIMENT

Figure 1:
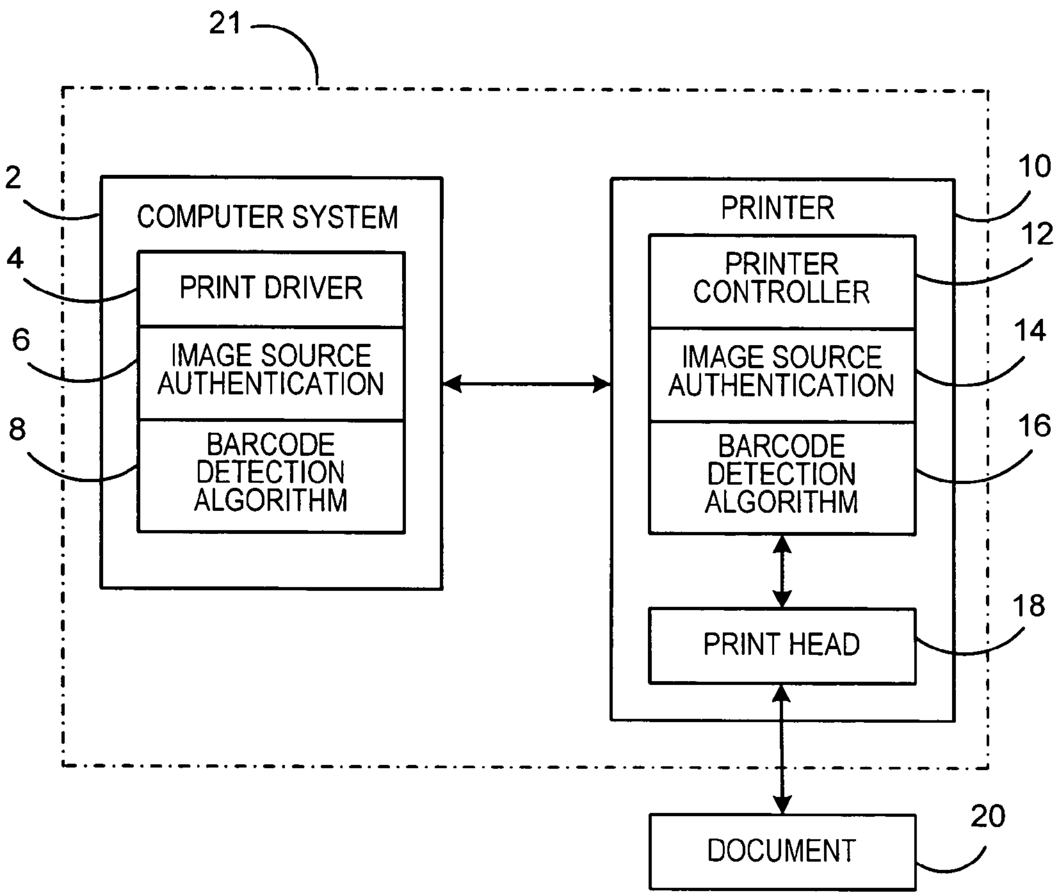
FIG. 1 is a block diagram of a system for printing both postal and non-postal documents embodying the present invention.

Reference is now made to FIG. 1. A postage printing system includes a computer system 2 which in some applications may be a PC. The computer system 2 may include host applications for any of a number of various applications that can be performed by the computer system. The computer system 2 includes a print driver software module 4. The print driver module 4 contains image source authentication functionality 6. The image source authentication 6 authenticates whether an image to be printed has been obtained from a secure source, such as an authorized postage meter provider or a secure encryption module, as for example a module (not shown) connected, either locally or remotely (e.g., via internet), to computer system 2. The printer driver 4 can also include a bar code detection algorithm 8. The bar code detection algorithm 8 is employed to detect the presence of a particular type of bar code that may be involved in printing postage indicia or other secure information. The bar code detection algorithm 8 may run continuously or only run when the image source authentication determines that the image source is not from a secure source.

The computer system 2 communicates with and controls a printer 10. The printer 10 includes a software printer controller module 12, which has image source authentication functionality 14. The image source authentication 14 performs a similar function in the printer as the image source authentication function 6 in computer system 2. The printer controller 12 can further include a bar code detection algorithm 16. The printer controller 12 is used to drive a print head 18 to print images on document 20. In a like manner, the bar code detection algorithm 16 can run continuously or selectively operate only when the image source authentication 14 indicates that the source is from a non-secure source.

The computer system 2, which may be a microcomputer, and the printer 10 can be enclosed in a single secure housing 21 of the postage printing system. However, the postage printing system can also be implemented in arrangements that do not include a single secure housing. The computing system 2 and the printer 10 can be separate units with a communication link. The bar code detection algorithm 8 may also be provided in the computer system 2 as is shown in FIG. 1. This is to prevent the computer system from sending to the printer 10 a bar code of the type used in secure indicia or other secure information when the source is determined to be coming from other than a secure authorized source. The bar code detection algorithm 16 in the printer can be less robust than the bar code detection algorithm 8 in the computer system 2. Bar code detection algorithm 16 is employed to prevent the printer 10 from driving the print head 18 to print a bar code of the type used in a secure indicia or other secure information if the image source authentication 14 determines the source of the image is from other than a secure authorized source. The printer controller 12 and the image source authentication algorithm 14 and the bar code detection algorithm 16 are preferably located in a secure module within the printer 10, but may alternatively be located in a separate, secure module outside of the printer 10.

Bar code detection algorithm 8 stops any attempt to print a bar code which could be of the type employed to print a fraudulent indicia or other information. The detection algorithm 8 also prevents the partial printing of a document as would incur in the printer 10 where the bar code algorithm 16 alone is employed and thus may save the supplies and ink in printing operations which are aborted. Having a bar code detection algorithm in both the computer system 2 and the printer 10 provides enhanced security; however, the bar code detection algorithm 8 is optional, particularly where the computer system 2 and the printer 10 are both enclosed in the single secure housing 21.

The bar code detection algorithm 16 is securely incorporated in the printer 10 to protect against the substitution of a different print driver in the computer system 2 such as where it is a separate PC. The particular architecture of the system can be modified and is a matter of design choice depending on the application and other constraints such as the specific hardware being employed. Various types of processing systems can be employed and various printers can be employed in accordance with the present invention and is not limited to applications employing a specific computer system or printer with any specific printing technology.

Figure 2:
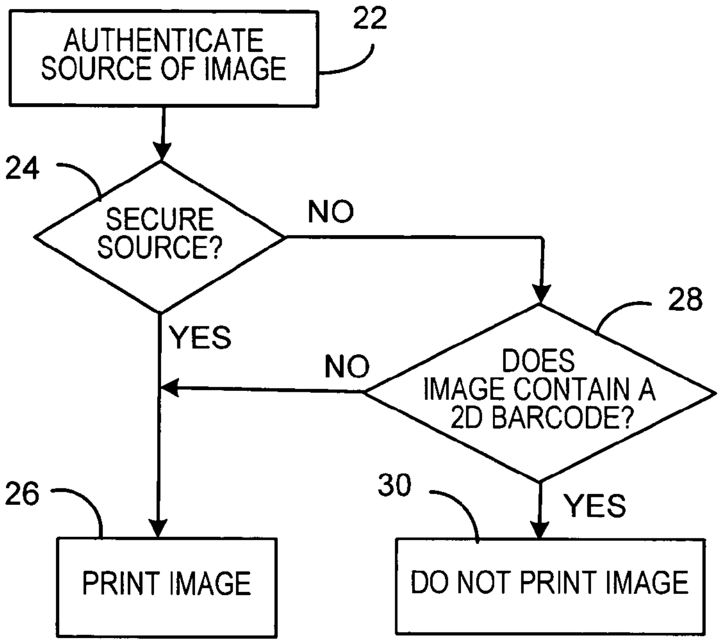
FIG. 2 is a flow chart of the operation of the printer shown in FIG. 1 enabling the printing of both postal and non-postal documents.

The bar code detection algorithms 8, 16 are only used when printing in non-secure mode as shown in the flowchart in FIG. 2. It should be noted that it is not necessary to implement a bar code detection algorithm both in the computer system 2 and printer 10. Printers generally have much less processing capability than computer systems and the bar code detection algorithm 8 in the computer system 2 could be much more robust than the algorithm implemented in the printer 10. Being more robust means that a greater number of algorithms may be employed to detect the presence of a barcode (e.g., checking for a rotated barcode). However, since the print driver 4 on the computer system 2 when it is not enclosed in a secure housing 21 could be easily replaced by a determined attacker, it is desirable that a bar code detection algorithm be implemented within the printer 10.

While there are a number of commercially available bar code decoding algorithms available for use within the print driver 4 on the computer system 2, these algorithms may be too computationally intensive for implementation within many commercially available printers. In addition to a lack of the needed computing power, printers often do not contain a full copy of the image they are printing. This may be due to the printer design or due to an insufficient amount of memory. A printer may receive only a portion of the image at a time. In some cases this amount of data resident in the printer may be restricted to the single column of data that is about to print. As a result, the complete bar code may not ever be resident in the printer at one time. Available two-dimensional bar code decoding algorithms generally require a complete image in order to find and decode the bar code. Therefore, a simpler algorithm is employed for implementation within the printer 10.

The printer 10 in the present system does not need to decode a two-dimensional or other bar code and only needs to detect that one might exist. In addition, the characteristics of the bar codes that must be detected allow a simple detection algorithm to be constructed. Bar codes printed for postal applications must be printed within tight specifications such as data content, module size, contrast, rotation, and the like. An example of such a postal bar code specification is contained in "Performance Criteria for the Information-Based Indicia and Security Architecture for Closed IBI Postage Metering Systems", United States Postal Service, Jan. 12, 1999. In addition, the structure of two-dimensional bar codes, for example a DataMatrix bar code, differs from other images and text. Such two-dimensional bar codes are arranged in rows and columns in what resembles a checkerboard pattern. Each intersection of a row and a column is referred to as a module. The columns are arranged at regular intervals. Due to the manner in which data is encoded, from one column to the next on average half of the modules change from black to white or white to black. These large periodic changes do not occur in normal images where the changes from black to white (or changes in contrast in a color image) are usually not periodic and are more gradual or in text where there are relatively few changes since most of the image is usually the background. This difference is illustrated in FIG. 3.

Reference is now made to FIG. 2. At 22, the source of an image in the printer 10 is authenticated. A determination is made at 24 whether the source image is from a secure authorized source. If the source is determined to be from a secure authorized source, the image is printed at 26. If the source of the image is determined not to be from a secure authorized source, a determination is made at 28 whether the image contains a bar code of the type used in postage indicia such as the 2-D bar code. If a determination is made that the image contains a bar code of the type used in postal indicia or other secure information, the printer 10 is disabled from printing the image at 30. If, however, a determination is made at 28 that the image from the non-secure source does not contain a bar code of the type print postal indicia or other secure information, the image is printed at 26.

The authentication of sources of the image in step 22 can be a determination as to whether the image source is from a trusted third party, as for example, a postage provider such as Pitney Bowes Inc., or is otherwise determined to be from an authorized secure source. Various forms of determining that the image is from a secure, authorized, source may include: testing for the incorporation of a password in the image data (e.g., in the file header), verifying via cryptographic operations (e.g., digital signature verification) that data that is transmitted to the printer with the image had been cryptographically certified by a trusted source, decoding image data that is encoded in a proprietary format that is used only for secure images, etc.

Figure 3:
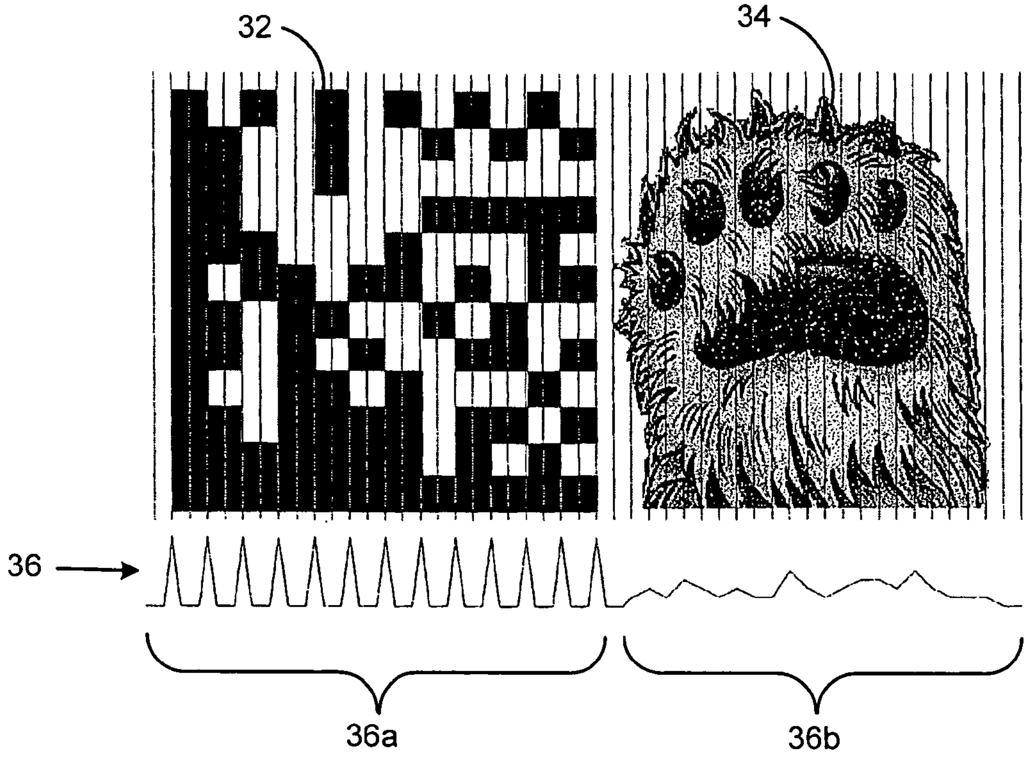
FIG. 3 is a depiction of various types of images that may be printed by the printer shown in FIG. 1 with a graph of the number of column to column transitions that exceed a given contrast threshold.

Reference is now made to FIG. 3. FIG. 3 illustrates the printing of a type of 2-D bar code at 32 and of a gray scale image at 34. The particular type of bar code is not critical to the present invention but is illustrative of one of the types of bar codes employed in secure postal indicia. Postal indicia of this type are described in detail in United States Postal Service (USPS) specification, entitled "Performance Criteria for the Information-Based Indicia and Security Architecture for Closed IBI Postage Metering Systems", United States Postal Service, Jan. 12, 1999.

As is illustrated in FIG. 3, bar code image 32 and the gray scale image 34, are each divided into columns as the printing signal progresses. Columns are further divided into rows (not shown). The intersection of a column and a row is commonly referred to as a pixel. Bar code 32 is a DataMatrix bar code and is of the type employed in postal indicia in a format specified by USPS. A graph of the column to column printed pixel transitions is shown at 36. In the preferred embodiment, a pixel transition is defined as a contrast difference greater than a given threshold (e.g., 50%) between two adjacent pixels (i.e., pixels in the same row, but in adjacent columns). This provides information and enables analysis about the types of images printed. The portion of the graph 36*a* is of the bar code portion of the printing 32, while the portion of the graph 36*b* of the gray scale image portion 34 of the printing. It will be noted that the column-to-column transitions depicted by graph 36*a* are repetitive and uniform, while the column-to-column transitions depicted by graph 36*b* are non-repetitive and non-uniform. This provides a distinction that is employed to determine which type of printing is involved. While described with respect to column to column transitions, other transitions (e.g., row to row transitions) or combinations of transitions are also possible and may be employed.

Thus the two images shown in FIG. 3, a bar code and a standard image, have vertical lines in the figure representing printed columns. Each pixel in a column is compared with the adjacent pixel in the previous column. The difference between the two pixels gray scale values is compared. The graph beneath the images represents a count of the number of differences per column that exceeded a given threshold, such as, for example, 50%. As can be seen from the graph the bar code exhibits a periodic pattern of peaks, while the image exhibits a much more random pattern. A bar code detection algorithm for a printer takes advantage of these features as hereinafter more fully explained.

Figure 4:
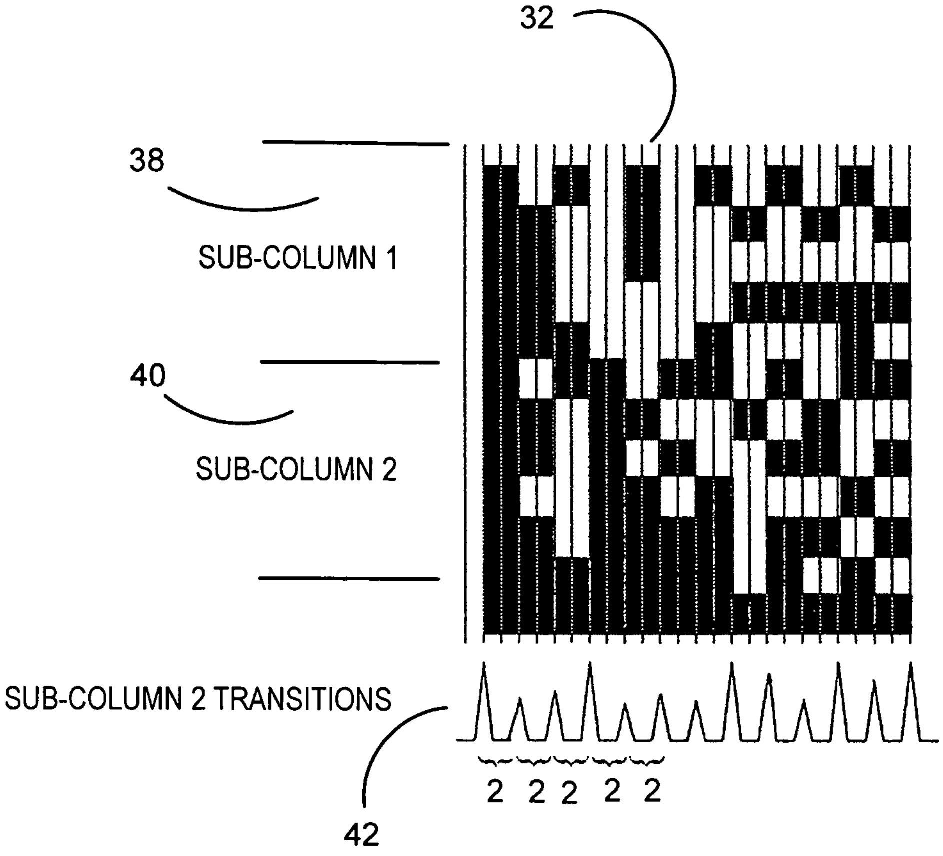
FIG. 4 is a further depiction of the printing by the printer shown in FIG. 1, and a graph of transitions helpful in an understanding of the present invention.

Reference is now made to FIG. 4. As can be seen in FIG. 4, the bar code image 32 is divided into subcolumns, subcolumn 1 at 38 and subcolumn 2 at 40. Dividing the bar code image into subcolumns allows the transitions in each subcolumn to be considered independently. Careful selection of subcolumn size ensures that at least one subcolumn lies entirely within any potential barcode. In this manner, portions of the bar code image such as the top of subcolumn 1 where subcolumn to subcolumn transitions of the pixels do not occur are excluded from the analysis. Inclusion of such portions could adversely impact the analysis by providing false transition data. Graph 42 of the subcolumn 2 transitions illustrates the number of transitions that exceed a contrast threshold (i.e., from black to white or white to black) from one subcolumn to the adjacent pixels in the next subcolumn (i.e., adjacent pixels in the same row). The height of the graph represents the number of transitions. The numbers below the graph 42 is the measure of the distance between the peaks that is 2 pixels. As can be seen, the peaks are periodic in spacing, this is typical of a 2D bar code.

The bar code detection algorithm first subdivides an image into subcolumns. The subcolumn height is chosen to be no larger than half the height of a smallest bar code that is to be detected. This guarantees that at least one subcolumn will be entirely contained within the bar code, as shown in FIG. 4. As the image is printed a history of transitions for each subcolumn is constructed. The result of the history for subcolumn 2 is illustrated in FIG. 4. The distance between the peaks in the history is measured. If the distance between peaks is uniform (2 pixels in the example) and also is a valid bar code module size, then a bar code has been detected. It should be noted that the distance between the peaks need not be constant, it only needs to fall within a range and may vary slightly from column to column, for example by one pixel. This might be the case if the print resolution does not evenly divide the bar code module size or in cases where pixel shaving, a method of increasing print quality of a barcode, is performed.

Figure 5:
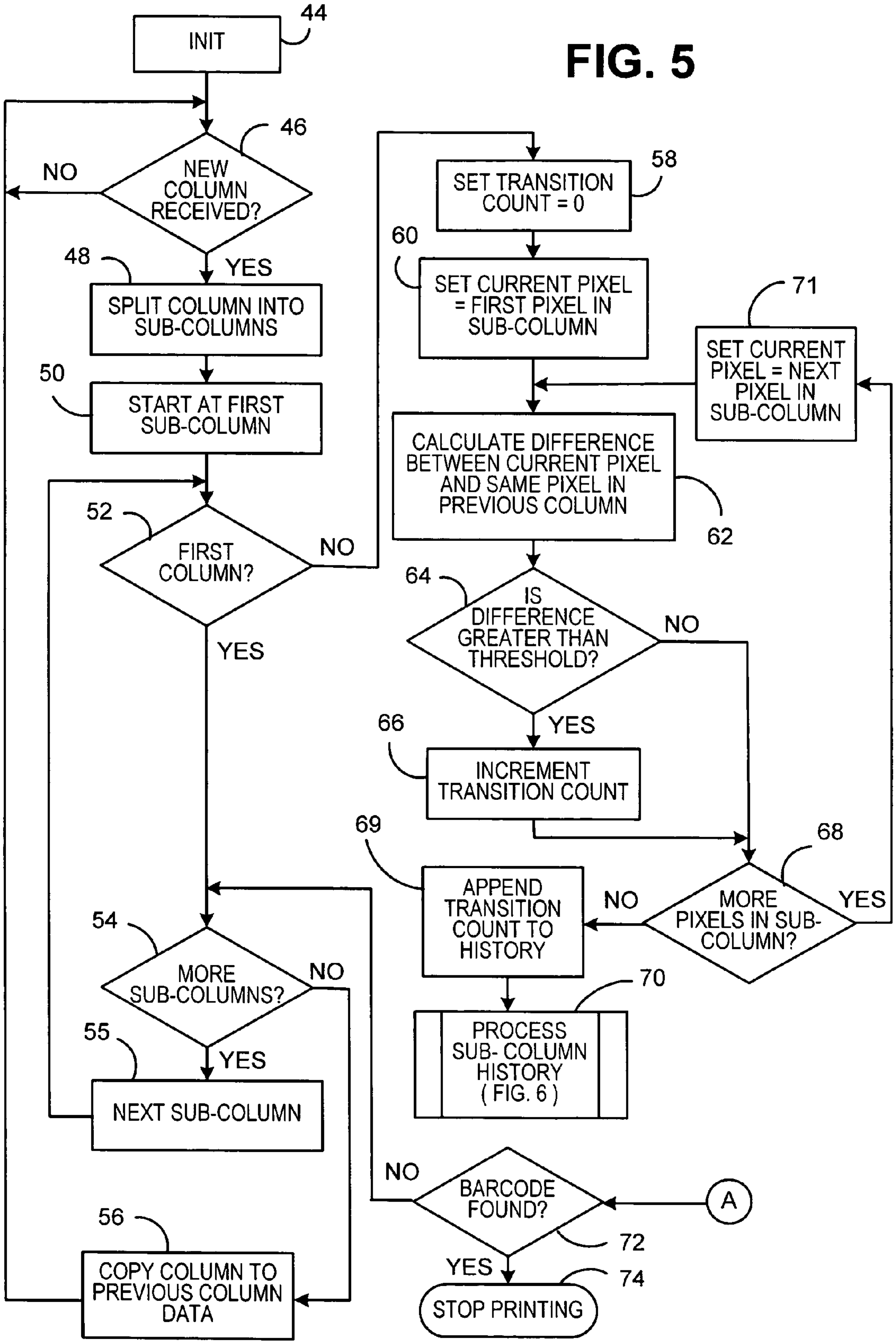
FIG. 5 is a flow chart of a bar code detection method employed in the printer shown in FIG. 1.

Reference is now made to FIG. 5, which illustrates in flow chart form a bar code detection method of the present invention. The system is initialized at 44 and the process of bar code detection is started. A determination is made at 46 if a new column has been received for analysis. If no new column is received the system waits at step 46 until a column is received. If a new column is received, the column is split into subcolumns at 48 and the analysis is started at the first subcolumn at 50. A determination is made at 52 if this is a first column of data.

Where this is the case, no analysis can be conducted because insufficient data is available. A determination is then made at 54 if more subcolumn data is available. If more subcolumn data is not available, the column data (consisting of all the data from all the subcolumns) is copied at 56 to function as the previous column data and processing continues at step 46. Where a determination is made at 54 that there is more subcolumn data, the next subcolumn is processed at 55 and the system loops back to determine if a new subcolumn is the part of the first column at 52.

When the determination is made at 52 that the data is not of a first column, at 58 a transition count is set to zero. At 60 a first pixel in the subcolumn is set as the current pixel and a calculation is made at 62 of the difference, e.g., the difference in contrast, between the current pixel and the same pixel (i.e., the adjacent pixel in the same row) in the previous subcolumn. A determination is then made at 64 whether the difference is greater than an established threshold. The threshold established for the system may be, for example, a 40% difference in contrast. If the difference is greater than the threshold, the transition count is incremented at 66. A determination is then made at 68 whether there are more pixels in the subcolumn. If at step 64 it is determined that the difference is not greater than the threshold, processing continues at step 68.

If there are more pixels in the subcolumn, at 71 the current pixel is set equal to the next pixel in the subcolumn. Processing continues thereafter at 62. Where, however, a determination is made at 68 that there are no more pixels in the subcolumn, the transition count is appended to the subcolumn history at 69. The subcolumn history is a list of the transition counts between adjacent subcolumns as calculated in steps 58, 60, 62, 64, 66, 68 and 71. Processing of the subcolumn history is implemented at 70 as is illustrated in the flow chart shown in FIG. 6. Based upon the results of processing the subcolumn history, a determination is then made at 72 if a bar code has been found in the printing that is of the type that can be employed in postal indicia. If so, printing is stopped at 74. If, on the other hand, no bar code is found, the process continues at decision block 54.

Figure 6:
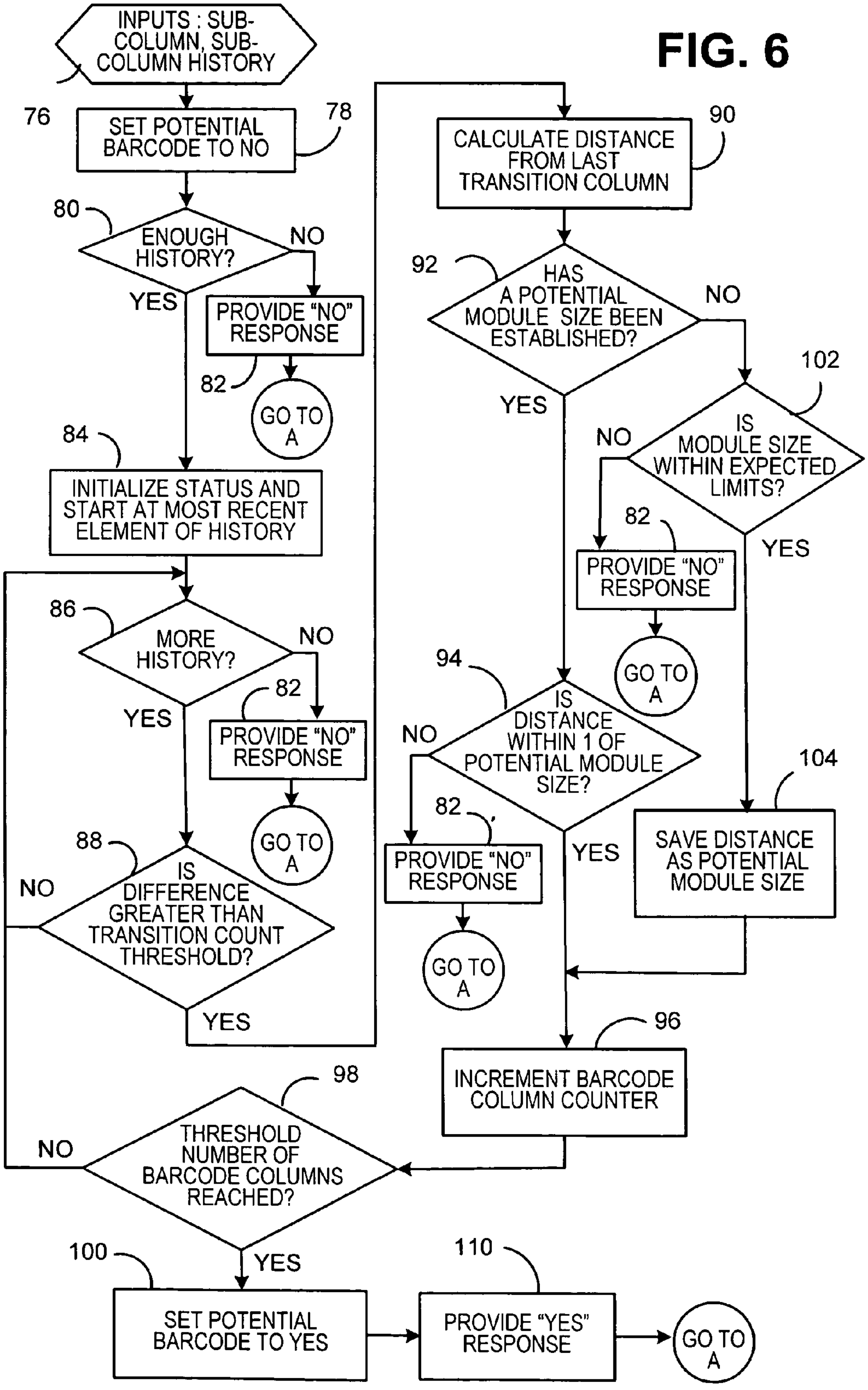
FIG. 6 is a flow chart showing the details of processing the sub-column history in accordance with an aspect of the present invention.

Reference is now made to FIG. 6, which illustrates in flow chart form the processing of sub-column history according to an embodiment of the invention. A subcolumn history is input at 76. The history is the data collected through the process described above in connection with the bar code detection shown in FIG. 5. The potential of the data being collected being from the printing of a bar code is set to "No" at 78. A determination is then made at 80 whether enough data is available to provide the required history of the print stream transitions. For example, if only a few columns of the image have been processed there is not enough data to determine if a barcode is present. If enough data is not available, the program branches to point 82, returning "No" as the detection of a potential barcode, and the processing branches to point "A", shown on FIG. 5 as an input to decision block 72. The process then continues as shown in FIG. 5 for a determination if a bar code has been found at block 72, and to decision block 54 for a determination if more subcolumns are available in an effort to gather additional data or to stop the printing at 74.

Referring again to FIG. 6, where enough history is determined to be available, at 84 the status is initialized and processing is started of the most recent data element of transition history. A determination is then made at 86 whether more history is available. If more history is not available, the program branches to point 82, returning "No" as the detection of a potential barcode, and the processing branches to point "A". If more history is available, a further determination is made at 88 if the difference is greater than the transition count threshold. The transition count threshold is exceeded when the transition count previously calculated (steps 58, 60, 62, 64, 66, 68 and 71) is greater than a predetermined amount. For a DataMatrix barcode this threshold may be set, for example, to 30% of the number of pixels in a subcolumn. As illustrated in FIG. 3, the transition count for a barcode contains periodic peaks. The transition count is used to determine the position of the peaks. Where the transition count threshold is not exceeded, processing of the next element of the history continues at step 86. Where the threshold is exceeded, the distance from the previous transition column (if one exists) is calculated at 90. The previous transition column/subcolumn is an earlier processed column that exceeds the transition threshold. The distance between two columns that exceed the transition threshold is used to calculate the distance (in pixels) between peaks.

A determination is then made at 92 if the potential module size has been previously established. If it is determined at 92 that the potential module size for a postal indicia bar code has not been established, a determination is then made at 102 if the module size is within the expected limits of such a bar code. The expected limits of module size are determined based upon the size of the barcode that the algorithm is attempting to detect. In FIG. 4 the module size is 2 pixels. A typical postal barcode printed at a resolution of 200 dots per inch would have a module size of between 2 and 4 pixels. If the module size is not within the expected limits of such a bar code, the program branches to 82, returning "No" as the detection of a potential barcode, and the processing branches to point "A". Where the module size is determined at 102 to be within the expected limits of a postal indicia bar code, the distance as a potential module size is saved at 104 and the process continues at 96 with an increment of the bar code column counter.

Where a determination is made at 92 that the potential module size has been previously established, a further determination is made at 94 if the distance is within one pixel or column of the potential module size previously established. If the distance is determined at 94 not to be within one pixel or column of the potential module size previously established, the program branches to point 82, returning "No" as the detection of a potential barcode, and the processing branches to point "A". If the distance is determined at 94 to be within one pixel or column of the potential module size previously established, the bar code column counter is incremented at 96. A determination is made at 98 if the threshold number of bar code columns has been reached. Where this is the case and the threshold number of bar code columns has been reached, at 100 the potential bar code is set to yes and the method branches to point 110, returning "Yes" as the potential detection of a barcode, and the processing branches to point "A". Where a determination is made that the threshold number of bar code columns has not been reached at 98, the system loops back to 86 for a determination if more transition data history is available.

The process described above exhibits several advantages over existing bar code recognition process. As a result, the process can be implemented within the limited processing environment of a printer. The advantages include that the entire image need not be processed at once. The history of transitions may be maintained in a relatively small amount of memory and may be calculated based upon only two columns of data at a time. Therefore the process algorithm may be executed while data is printing or while the image is being transferred to the printer. Additionally, the operations required by the process are relatively simple (subtraction and comparison) and may be implemented in a limited processing environment without significant performance impact. Accordingly, the process that performs the bar code detection does not require significant memory requirements or computing power requirements. Thus, the process can be easily implemented in many printers. The capability to perform the process can be provided in printers and can be selectively activated at a later time when the printer is connected to a host and is to be used for applications involving the printing of secure and non-secure images, such as the printing of postage indicia.

The secure image as noted above may be a postal indicium containing a specific type of postal bar code as a specific critical element of the postal indicia. The secure image may also be an event ticket containing a barcode with seat information, a certificate of authenticity for a collectable with a barcode containing information about the collectable, a money order with a barcode containing financial information, etc. Additionally, the various percentages referred to above (30%, 40% and 50% are representative of types of percentages that may be employed and are not critical and are a matter of design based on the requirements of any particular application.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A method for a printing system to print images from a secure source and a non-secure source using a single printer, said images from said secure source including a specific critical element, said method comprising:

determining by the printing system if an image to be printed is from a secure source or from a non-secure source;

if said image to be printed is from said non-secure source, determining by said printing system if said image contains said specific critical element;

disabling said printer from printing said image from said non-secure source if said image contains said specific critical element; and enabling said printer to print said image from said non-secure source if said image does not contain said specific critical element.

2. The method as defined in claim 1 wherein said specific critical element comprises a bar code.

3. The method as defined in claim 2 wherein said bar code is contained in a postal indicium.

4. The method as defined in claim 3 wherein said bar code is a 2-D type bar code.

5. The method as defined in claim 4 wherein said bar code is a DataMatrix type bar code.

6. A postage printing system for printing images from a secure source and a non-secure source, said images from a secure source including a specific critical element, said system comprising:

a printing device;

means for determining if an image to be printed is from a secure source or from a non-secure source;

means for determining if said image contains said specific critical element; and means for disabling printing of said image by said printing device if said image is from said non-secure source and said image contains said specific critical element.

7. The postage printing system as defined in claim 6 wherein said specific critical element comprises a bar code.

8. The postage printing system as defined in claim 7 wherein said bar code is contained in a postal indicium.

9. The postage printing system as defined in claim 7 wherein said printing device is connected to a computer system.

10. The postage printing system as defined in claim 9 wherein said computer system further comprises:

means for identifying a source of an image; and means for detecting a bar code in said image.

11. A method for a printing system to print images from a secure source and from a non-secure source on a single printer, said images from said secure source including a specific critical element, said method comprising:

commencing, by said printer. printing of an image from said non-secure source;

during the printing of said image from said non-secure source, determining, by said printing system, if said image contains said specific critical element; and disabling said printer from completing said printing of said image from said non-secure source if said image contains said specific critical element.

12. The method as defined in claim 11 wherein said specific critical element comprises a bar code.

13. The method as defined in claim 12 wherein said bar code is contained in a postal indicium.

14. The method as defined in claim 12 wherein said bar code is a 2-D bar code.

* * * * *